United States Patent [19]
Rancourt

[11] Patent Number: 5,478,983
[45] Date of Patent: Dec. 26, 1995

[54] PROCESS AND APPARATUS FOR WELDING OR HEAT TREATING BY LASER

[76] Inventor: Yvon Rancourt, 3901 Chemin St. Sauvage, Apt. 103, St. Adèle, Quebec, Canada, J0R 1L0

[21] Appl. No.: 65,890

[22] Filed: May 25, 1993

Related U.S. Application Data

[63] Continuation-in-part of Ser. No. 964,699, Oct. 22, 1992.

[51] Int. Cl.⁶ .......................... B23K 26/00; B23K 26/06
[52] U.S. Cl. ................ 219/121.63; 219/121.64; 219/121.73; 219/121.75; 219/121.77
[58] Field of Search ................... 219/121.63, 121.64, 219/121.85, 121.61, 121.73, 121.74, 121.75, 121.77

[56] References Cited

U.S. PATENT DOCUMENTS

| | | | |
|---|---|---|---|
| 4,760,236 | 7/1988 | Stoll | 219/121.63 |
| 5,055,653 | 10/1991 | Funami et al. | |
| 5,194,711 | 3/1993 | Gaukroger | 219/121.67 |

FOREIGN PATENT DOCUMENTS

| | | |
|---|---|---|
| 136780 | 4/1985 | European Pat. Off. . |
| 233091 | 8/1987 | European Pat. Off. . |
| 2212852 | 7/1974 | France . |
| 3705500 | 9/1988 | Germany . |
| 2020681 | 3/1990 | Japan . |
| 2183522 | 6/1987 | United Kingdom . |

*Primary Examiner*—Mark H. Paschall

[57] ABSTRACT

Method and apparatus for welding, cutting, surface machining or heat treating workpieces by a laser beam which includes providing an optical element in the path of the laser beam to modify the pattern of the laser beam such that different geometric patterns can be projected on the focal plane, and this beam pattern spans at least the width of the heat treatment, cutting, surface machining or welding zone on the workpieces.

24 Claims, 11 Drawing Sheets

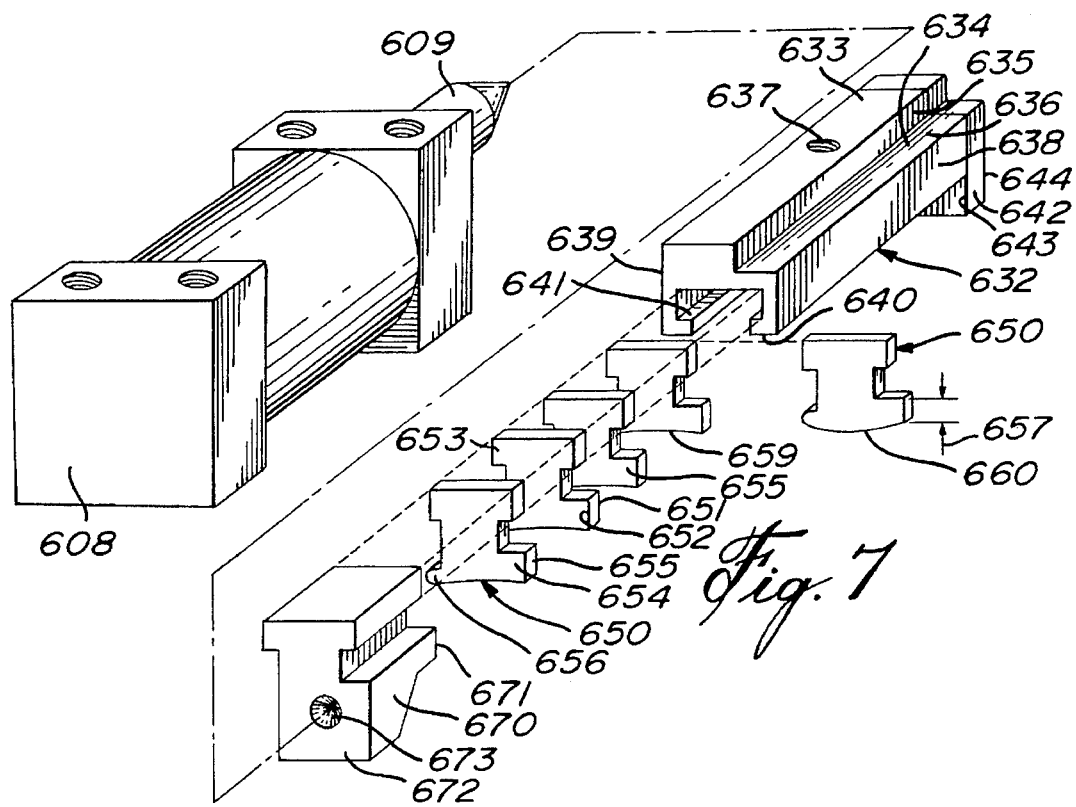
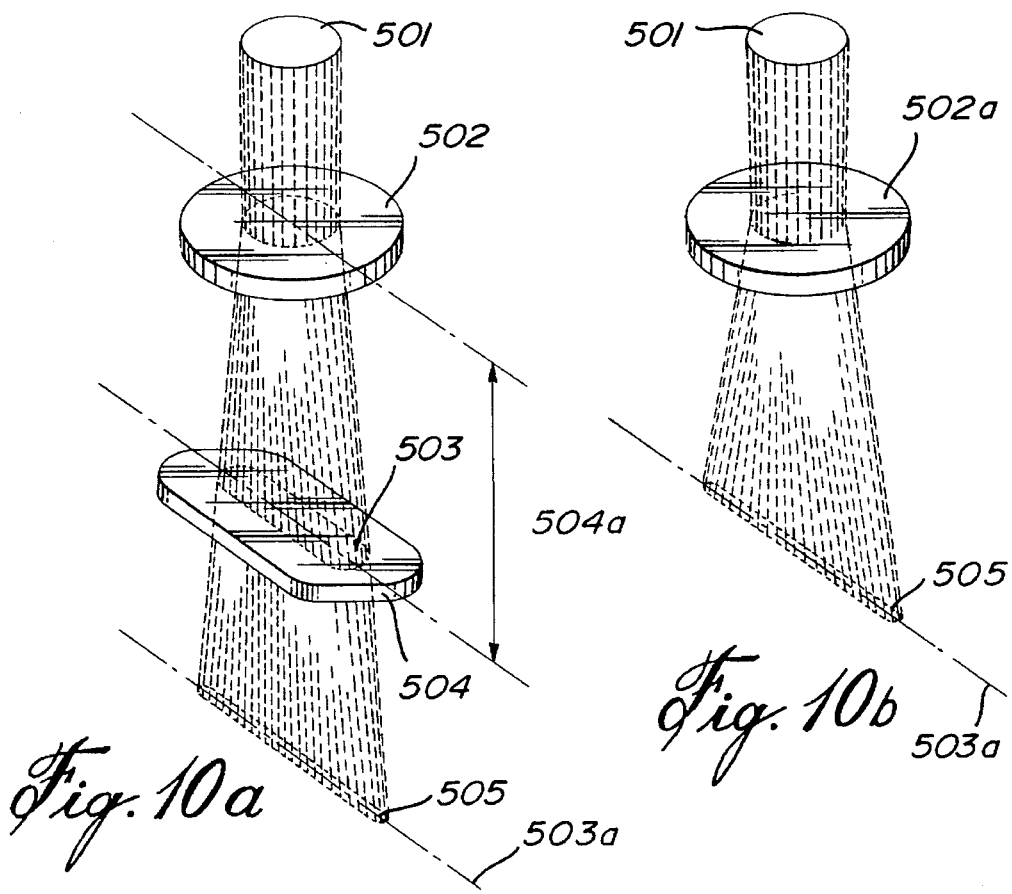
Fig. 7
Fig. 10a
Fig. 10b

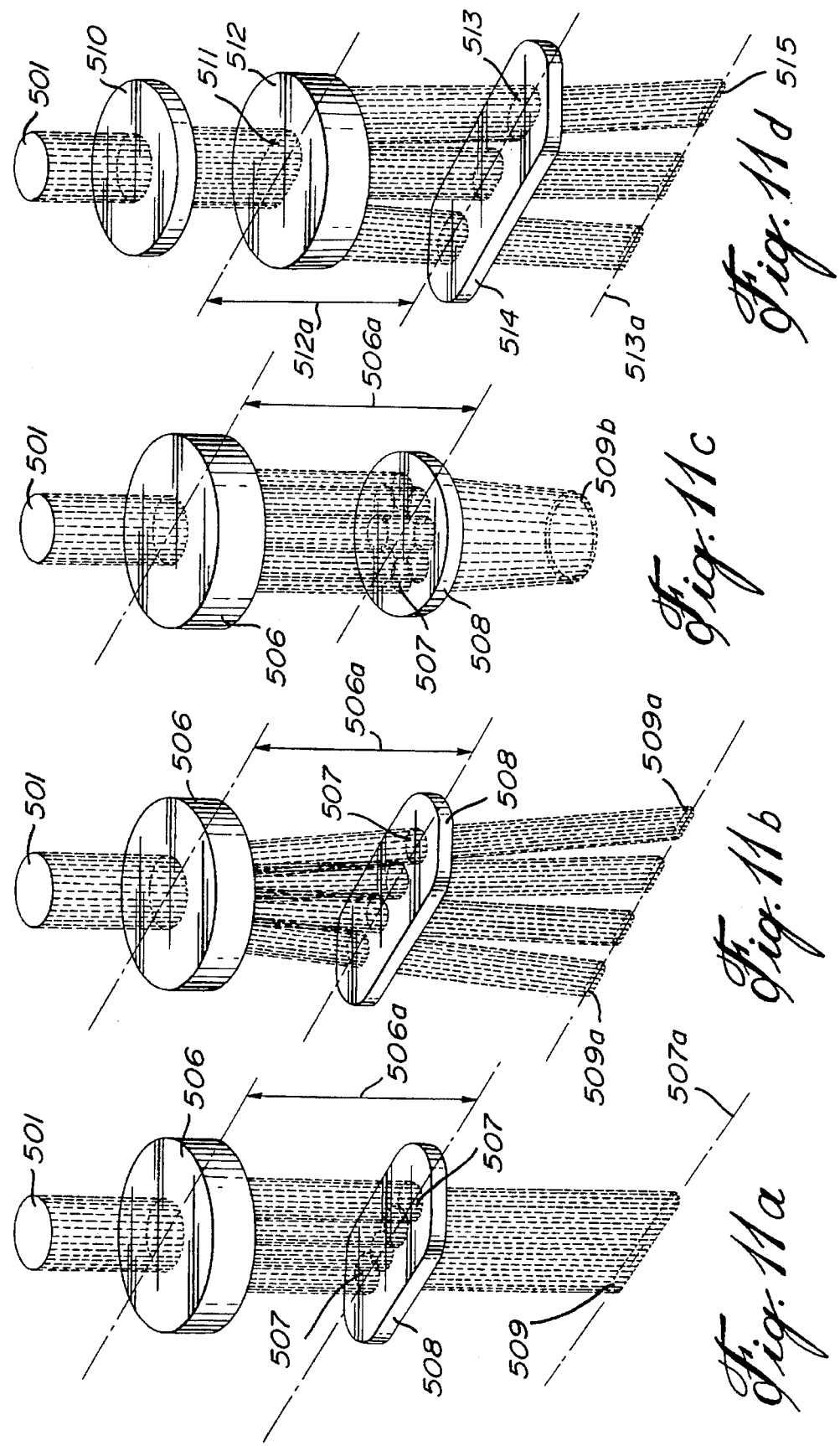

5,478,983

PROCESS AND APPARATUS FOR WELDING OR HEAT TREATING BY LASER

CROSS-REFERENCE TO RELATED APPLICATIONS

The present application is a continuation-in-part application of application Ser. No. 07/964,699, filed Oct. 22, 1992 pending.

BACKGROUND OF THE INVENTION

1. Field of the Invention

The present invention relates to laser welding, heat treating and surface machining techniques, particularly to improvements in laser beam delivery systems.

2. Description of the Prior Art

It is well known that the welding of bellows or expandable bladders (shown in U.S. Pat. No. 4,102,438) by electron beam or laser welding techniques has a high cost and is a time consuming process implicating the repetitive welding of the inside-diameter edges and outside-diameter edges of each annular sheet forming the bellows.

It is also recognized that a major problem is the welding of relatively large diameter bellows (over 12 inches in diameter), particularly produced from relatively thin material (±0.005"). The deformation produced by the thermal expansion from the repetitive welding generates stress at the welding seam which makes it very difficult, if not impossible, to produce fluid-tight bellows on a large scale, without suffering a high rate of rejects.

It is also well known that the tracking of a seam to be welded, using a focused circular beam centered on the seam, by electron scanning or other methods, reduces the linear welding speed in view of the reaction time delay involved, and that such tracking is limited to one seam at a time.

It is also well known that it is relatively easy to scan and control the focus of an electron beam from an electron beam welder at high speed (measured in KHZ) since the beam is deflected and focused electromagnetically when used principally for heat treating or surface machining. However, with laser equipment, the scanning and focusing of a laser beam is done mechanically through mirrors or lens, thus limiting the speed and precision thereof. Great strides were made in improving surface heat treating or machining with the use of electron beam high speed scanning. However, the high cost, complexity and the negative environmental impact of electron beam equipment have limited the use of this technique.

Another factor which has a serious cost impact in laser surface machining is the limited area covered by the laser focal beam at the working surface, thus requiring a large amount of beam scanning or work piece movements, to cover a working area larger than the focal beam diameter.

SUMMARY OF THE INVENTION

It is an aim of the present invention to provide an improved laser welding technique.

It is a further aim of the present invention to provide an improved laser beam delivery system means to provide, in the focal plane, an oblong laser beam pattern in order to produce an improved tracking speed for a welded seam, to allow the simultaneous welding of a plurality of seams, to improve laser surface machining or heat treating technique, that is, to assume the features of an electron beam welder without the high cost and negative environmental impact involved in electron beam welding, heat treating or surface machining techniques.

It is a further aim of the present invention to provide an improved laser beam delivery system to provide, in the focal plane, different geometrical shapes, such as an annular or "S" shape in order to produce an effect similar to a spot weld or to weld relatively small pieces instantaneously without having to make linear movements, thus reducing the negative impacts created by thermal distortion and the cost involved.

It is a further aim of the present invention to provide an improved laser beam delivery system to provide, in the focal plane, a plurality of oblong beam patterns in order to weld simultaneously a plurality of spaced-apart seams and to heat treat or surface machine a plurality of areas simultaneously from a workpiece or different workpieces.

A heat treatment, surface machining, cutting or welding system in accordance with the present invention utilizes at least a laser beam, wherein workpieces to be heat treated, surface machined, cut or welded are placed in a focal plane, within the focal depth of the laser beam, and an optical element interrupts the laser beam to project the beam with a predetermined geometric pattern other than a circular spot at the focal plane.

More specifically, an application zone having a width to include the area of heat treatment, surface machining, or a weld, is determined, and the geometric beam pattern is determined which at least spans the application zone.

A method of welding a plurality of parallel continuous seams on workpieces in accordance with the present invention comprises the steps of defining a welding station including a laser welding source and a focal plane spaced from the laser welding source and wherein the focal plane is perpendicular and intersects a plane containing the laser welding beam, the laser welding beam spanning a welding zone defined at the intersection of the focal plane and the plane containing the laser beam, maintaining the seams to be welded spaced apart and parallel and moving at least one of the welding stations and the several workpieces, in unison, relative to one another such that the seams to be welded pass through the welding zone whereby welded seams are formed continuously on the workpieces.

An apparatus for heat treating, surface machining, or welding workpieces according to the present invention includes at least a laser beam generating means, means defining a focal plane in which workpieces are placed, and at least an optical element located in the path of the laser beam such that a geometric pattern other than a circular spot is provided at the focal plane.

The optical element may be a diffractive optical element capable of dividing the laser beam into a plurality of beams forming overlapped or spaced-apart geometric patterns at the focal plane.

It is also contemplated to use two or more laser sources and to transmit the laser beams through the optical element or optical elements arranged in series in the path to provide a plurality of overlapped or spaced-apart geometric patterns on the focal plane.

An apparatus for welding a plurality of parallel continuous seams to join several workpieces is provided which includes jig means for maintaining the workpieces and for holding the workpieces and the seam to be welded in a welding zone, welding means including a laser welding source and a focal plane spaced apart from the laser welding source, means passing the laser beam in a plane intersecting and perpendicular to the focal plane, an optical element placed in the path of the laser beam such that the beam forms a geometric pattern which spans the welding zone at the focal plane, and means for moving one of the welding station and the jig such that the seams to be welded pass continuously through the welding zone whereby welded seams are formed continuously on the workpieces.

The laser beam can be used in the context of this invention to treat workpieces besides welding. For instance, by increasing the energy of the laser beam or beams at the focal plane, the workpieces may be cut. The workpieces, if desired, may be subject to surface machining by this process, or the workpiece, especially if it is a metal, may be subjected to heat treatment. What is common in each situation is that the state of the material of the workpiece has been altered at least partially by thermal energy. For the purpose of this patent application, the phrase "for partially altering the state of the composition of a workpiece by thermal energy" will include cutting, welding, surface machining, and heat treating.

BRIEF DESCRIPTION OF THE DRAWINGS

Having thus generally described the nature of the invention, reference will now be made to the accompanying drawings, showing by way of illustration, preferred embodiments thereof, and in which:

FIG. 7 is an enlarged exploded fragmentary perspective view of a detail of the welding jig;

FIG. 10a is a schematic view of a laser beam delivery system to produce an oblong beam pattern;

FIG. 10b is another schematic view of a laser beam delivery system to produce an oblong beam pattern;

FIGS. 11a, 11b, 11c, 11d, 11e, 11f, and 11g are schematic views of laser beam delivery systems to produce oblong beam patterns or other geometric patterns using a beam divider;

FIG. 14 is an enlarged fragmentary view of a detail of FIG. 13.

DESCRIPTION OF THE PREFERRED EMBODIMENTS

Figure 1:
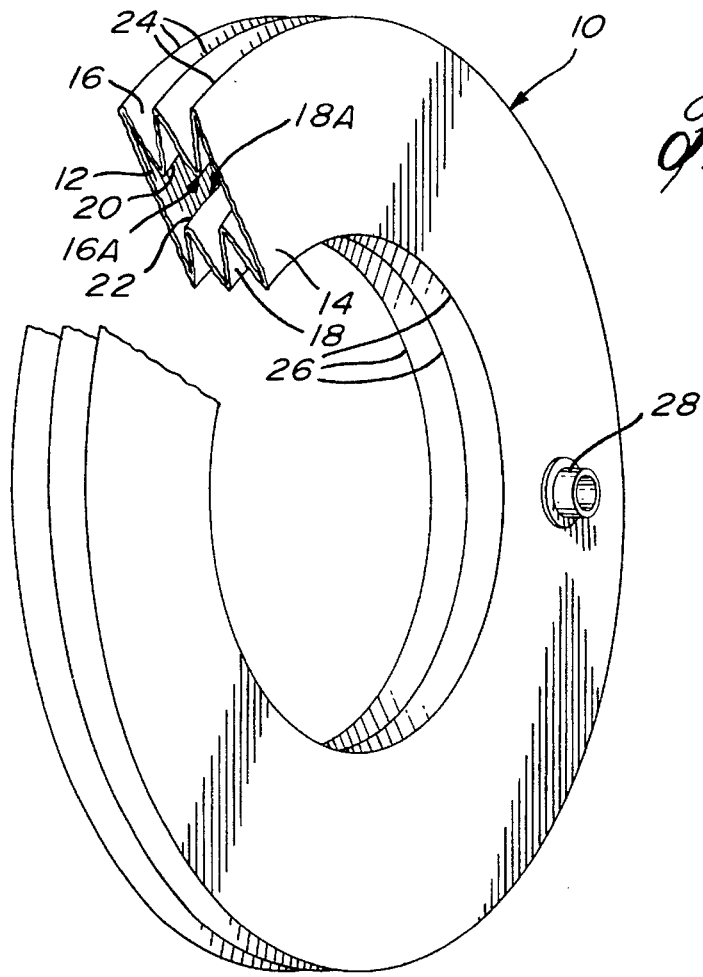
FIG. 1 is a perspective view, partly in cross-section, showing a typical annular expanded bladder or bellows.

Referring to FIG. 10a herein, laser beam 501 is transformed by means of an optical element such as a first mirror or lens 502 to an oblong beam 503. Oblong beam 503 is then focused transversally to longitudinal axis 503a by means of a second mirror or lens 504 to produce a generally oblong shaped beam 505 in the focal plane. This oblong focal beam 505 is particularly useful to simultaneously fusion weld a plurality of seams, or to track and fusion-weld a seam at high speed.

Beam 501 may be transformed in one step to an oblong focal beam 505 by means of a suitable optical element such as a lens or mirror 502a, as shown in FIG. 10b. The advantage of using a plurality of optical elements, as shown in FIG. 10a, is that the longitudinal dimension of axis 503a of oblong focal beam 505 may be calibrated to different sizes by varying the distance 504a between the lens or mirrors with an adjusting means.

In a second alternative embodiment in a laser beam delivery system, referring to FIG. 11a, beam 501 is divided by means of a beam divider 506 to a plurality of circular divided beams 507, generally overlapped, which are then focused transversally to longitudinal axis 507a by means of a focal mirror or lens 508 to produce at least a generally oblong focal beam 509. The beam divider may be a diffractive optical element, such as developed by the National Optics Institute of Sainte-Foy, Quebec, Canada, and Gentec, also of Sainte-Foy, Quebec, Canada. These elements may be obtained from Gentec.

The plurality of circular divided beams 507 may be parallel, convergent or divergent. The longitudinal dimension of axis 507a of focal beam 509 may be calibrated to different sizes, when using a convergent or divergent beam divider, by varying the distance 506a between the beam divider 506 and the focal mirror or lens 508 with an adjusting means. When using a parallel beam divider as shown in FIG. 11a, the distance 506a between beam divider 506 and focal mirror or lens 508 may be changed without affecting the focal beam 509. This is particularly useful when a telescopic beam delivery system is used. Referring to FIG. 11b, a plurality of focal oblong beams 509a may be produced by spacing apart the circular divided beams 507 and then by focusing them to simultaneously perform a plurality of functions. As can be seen, the beams are divergent.

Figure 11F:
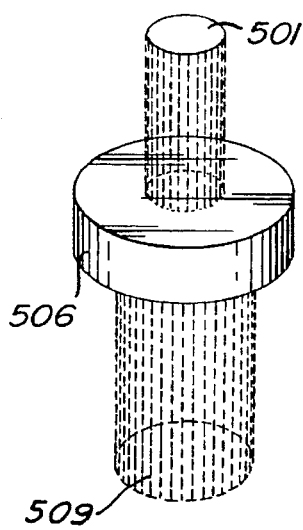
Figure 11E:
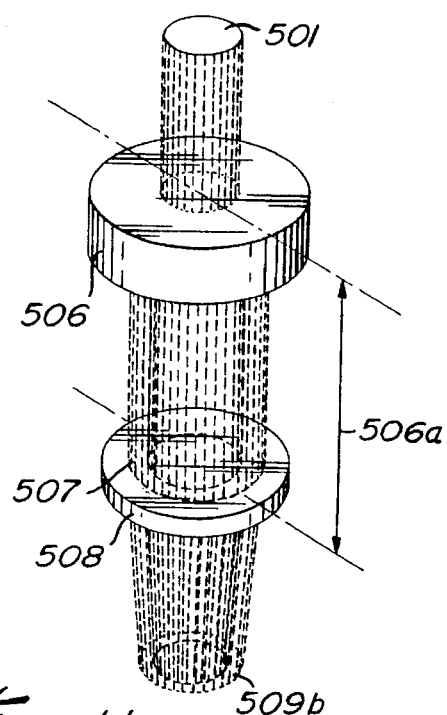

Referring to FIG. 11c, it has also been contemplated to arrange the circular divided beams 507 such that shapes other than oblong may be produced in the focal plane, such as an "S" shape, oval or a ring. A ring pattern 509b is particularly useful for producing the equivalent of a spot weld without having the negative impacts of the undercut produced by electrodes. Also, instantaneous welding or brazing of relatively small circular pieces can be accomplished without having to do circular movements, thus eliminating thermal distortion, particularly critical in relatively thin material, and reducing the cost involved in machinery. FIGS. 11e and 11f show other examples including a pair of annular beams produced in FIG. 11e with a diffractive optical element. FIG. 11f shows a single optical element to form an annular beam and to size it at the focal plane.

Figures 11G, 14:
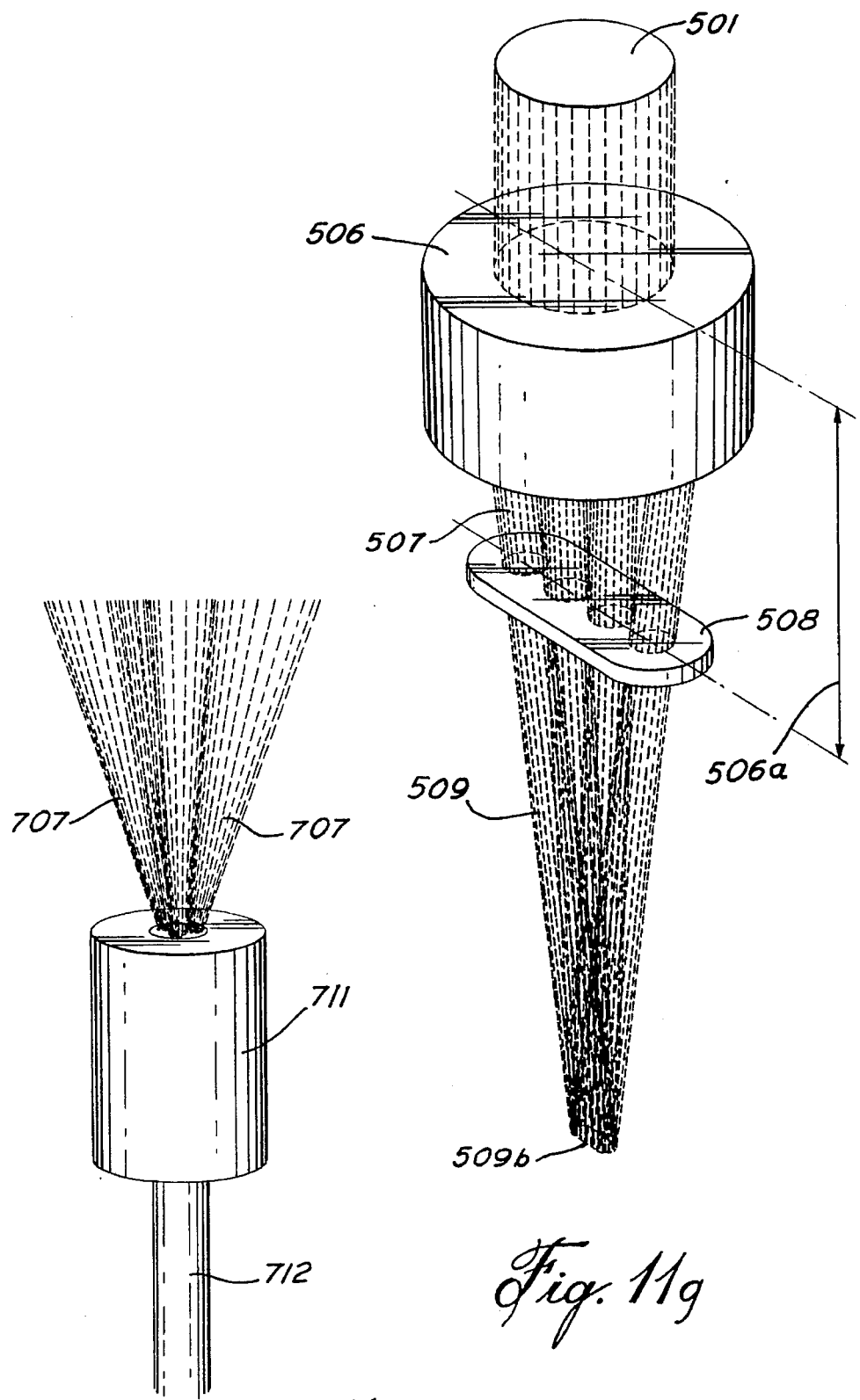

In a third embodiment of a laser beam delivery system, referring to FIG. 11d, beam 501 is transformed by means of a lens or mirror 510 to a primary oblong beam 511 which is then divided by means of a beam divider 512 to a plurality of secondary oblong beams 513, generally lined up, which are then focused transversally to longitudinal axis 513a by means of lens or mirror 514 to produce at least a wide, generally oblong, focal beam 515 or a plurality of generally oblong focal beams 515. The plurality of secondary oblong beams 513 may be parallel, convergent or divergent. The longitudinal dimension of axis 513a of focal beam 515 may be calibrated to different sizes, when using convergent or divergent beam dividers, by varying the distance 512a between the beam divider 512 and the focal mirror or lens 514. When using a parallel beam divider, the distance 512a, between the beam divider 512 and the focal mirror or lens 514, may be changed without affecting the focal beam 515. FIG. 11g shows beam divider 506, which converges the divided beams while the lens or mirror 508 focalizes the beams at the focal plane while providing the oblong pattern.

Figure 12A:
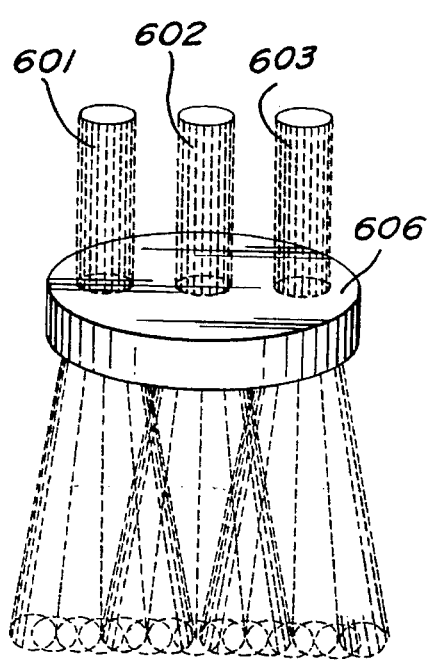
FIGS. 12a and 12b are schematic views of laser beam delivery systems utilizing a plurality of laser sources.
Figure 12B:
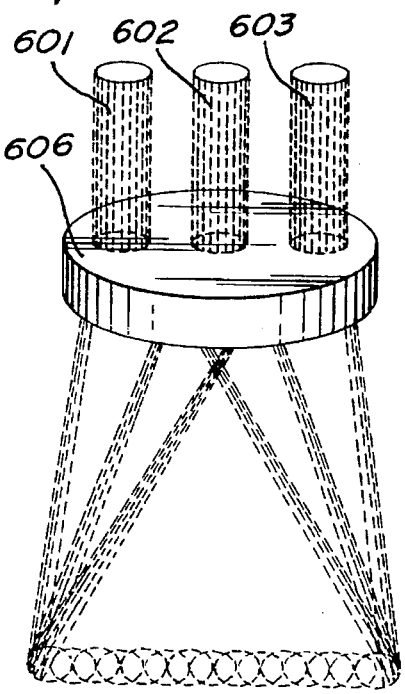

Referring to FIGS. 12a and 12b, there are shown two embodiments of the use of three laser sources, each with laser beams 601, 602, and 603. The laser beams are directed to the optical element 606 in both cases. The optical element 606 may be a diffractive optical element. The optical element 606, in the case of FIG. 12a, directs the beams to cover a wider span with roughly the same density while providing an oblong pattern. It has been found that in using a single laser source with a single laser beam, the density of the energy towards the end of the major axis of the oblong pattern at the focal plane may be diminished compared to the density in the central portion thereof. By selecting a suitable optical element, in this case a diffractive element, the distribution of the energy density can be controlled over the span area. For instance, by providing a greater overlap of the beams towards the ends of the major axis of an oblong pattern, the difference in incidence angle may be compensated therefor.

In FIG. 12b, the three laser beams are transmitted by the diffractive optical element 606 to extend over the same span area in order to increase the density of the laser in the area beam span.

The provision of at least three laser beams from three different laser sources allows a more even distribution of the energy in the span and allows a wider span. It is anticipated that the preferred laser source would be an Nd:Yag laser for these types of applications.

Figure 13:
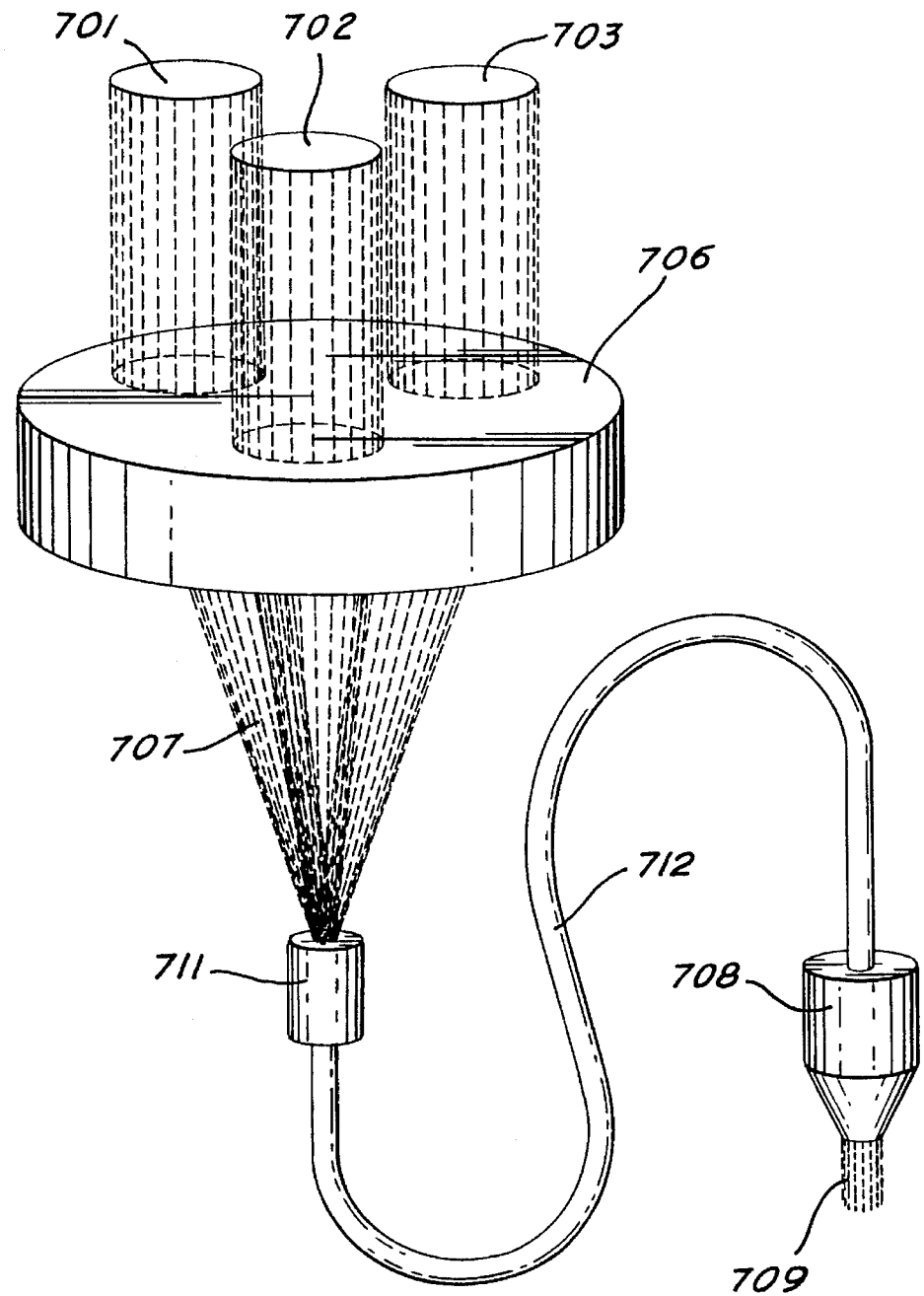
FIG. 13 is a schematic view of a laser beam delivery system utilizing a plurality of laser sources and fiber optics.

Referring now to FIGS. 13 and 14, a plurality of laser sources, such as Yag lasers, are represented by the three laser beams 701, 702, and 703, which are transmitted through the diffractive element 706. The transmission between the diffractive optical element 706 and the delivery optical element 708 is done through fiber optics 707 where the three beams are transmitted. As shown in FIGS. 13 and 14, the beams 707 transmitted by diffractive element 706 are focused at the fiber optical end 711 which transmits the laser beams through a fiber optics element represented schematically at 712. The beams then pass through delivery optical element 708 which will then focalize the beams. Reference is made to fiber optics delivery of laser beams as supplied by Rofin Sinar of Plymouth, Mich.

It is also contemplated that the three laser sources could operate alternately in pulses so that each beam is transmitted in successive pulses and thus increase the energy output. As is well known, a higher energy laser beam can be obtained by pulsing the laser beam generation to produce higher energy peaks. By properly sequencing the plurality of laser generators aimed at the diffractive optical element as shown in FIGS. 12a, 12b, 13 and 14, an almost constant average greater energy density can be produced for welding, cutting, surface machining or thermal treatment of the workpieces. Reference is made to work done by Gentec in terms of laser beam monitoring. (Laser Pulse Analyser (LPA-1).

The embodiments shown in FIGS. 12a, 12b, 13 and 14, for instance, is a way of obtaining a more powerful laser projection.

Reference will now be made to embodiments in a technique to weld simultaneously a plurality of seams particularly applied to the welding of annular bellows which are more complex to produce than linear seam welds. Such a bellows may be utilized as a bladder in U.S. Pat. No. 4,102,438.

Referring to FIG. 1, an annular bellows 10 includes annular end plates 12 and 14, annular outer concentric stage 16, and annular internal concentric stage 18. Each stage 16 and 18 is made up of an accordion arrangement of annular sheets or plates 19. Alternate inner and outer diameter welded seams in each stage and with the end plates 12 and 14 complete the bellows. A fluid inlet 28 is used when the annular bellows 10 performs as an expandable bladder.

The outside diameters of the external stage 16 and end plates 12 and 14 are welded at seams 24. The inside diameters of internal stage 18 and end plates 12 and 14 are welded at seams 26. The inside diameters of the external stage 16 are welded at seams 20. The outside diameters of the internal stage 18 are welded at seams 22.

Figure 2:
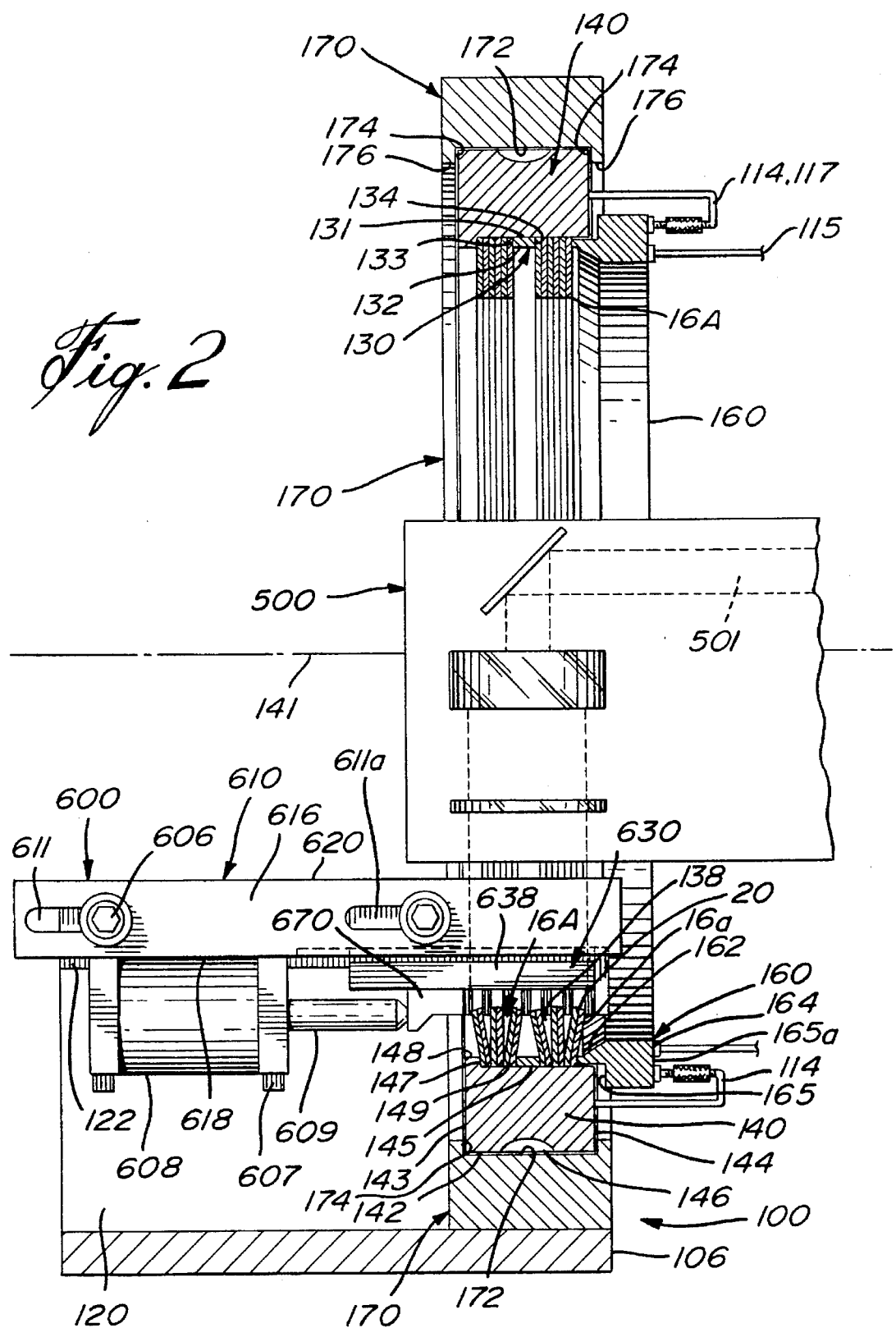
FIG. 2 is a fragmentary axial cross-section taken through a laser sub-assembly welding jig for welding the inside diameter of the outer concentric stage of annular plates.

In the present embodiments, bellows 10 or a plurality of bellows 10 are welded in four phases as follows:

PHASE I: Referring to FIGS. 1 and 2, the external stage 16 is welded by pairs at their inside diameters 20 to form sub-assembly 16A at a sub-assembly welding station 100 as will be described later. FIG. 2 refers to a laser welding technique.

Figure 3:
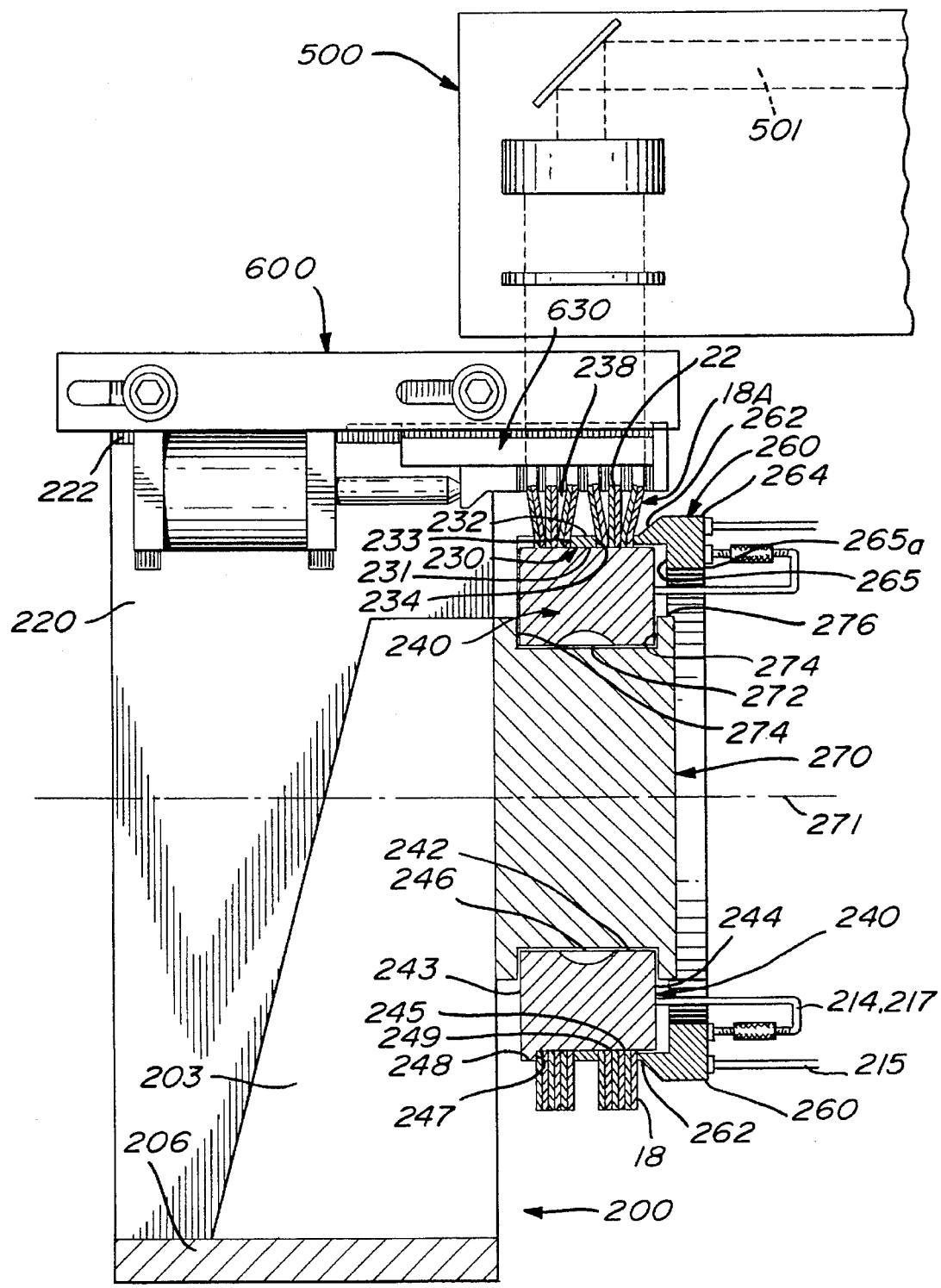
FIG. 3 is a fragmentary axial cross-section taken through a laser sub-assembly welding jig for welding the outside diameter of the inner concentric stage of annular plates.

PHASE II: Referring to FIGS. 1 and 3, the internal stages 18 are welded by pairs at their outside diameter 22 to form sub-assembly 18A, at a sub-assembly welding station 200 as will be described later. FIG. 3 refers to a laser welding technique.

Figure 4:
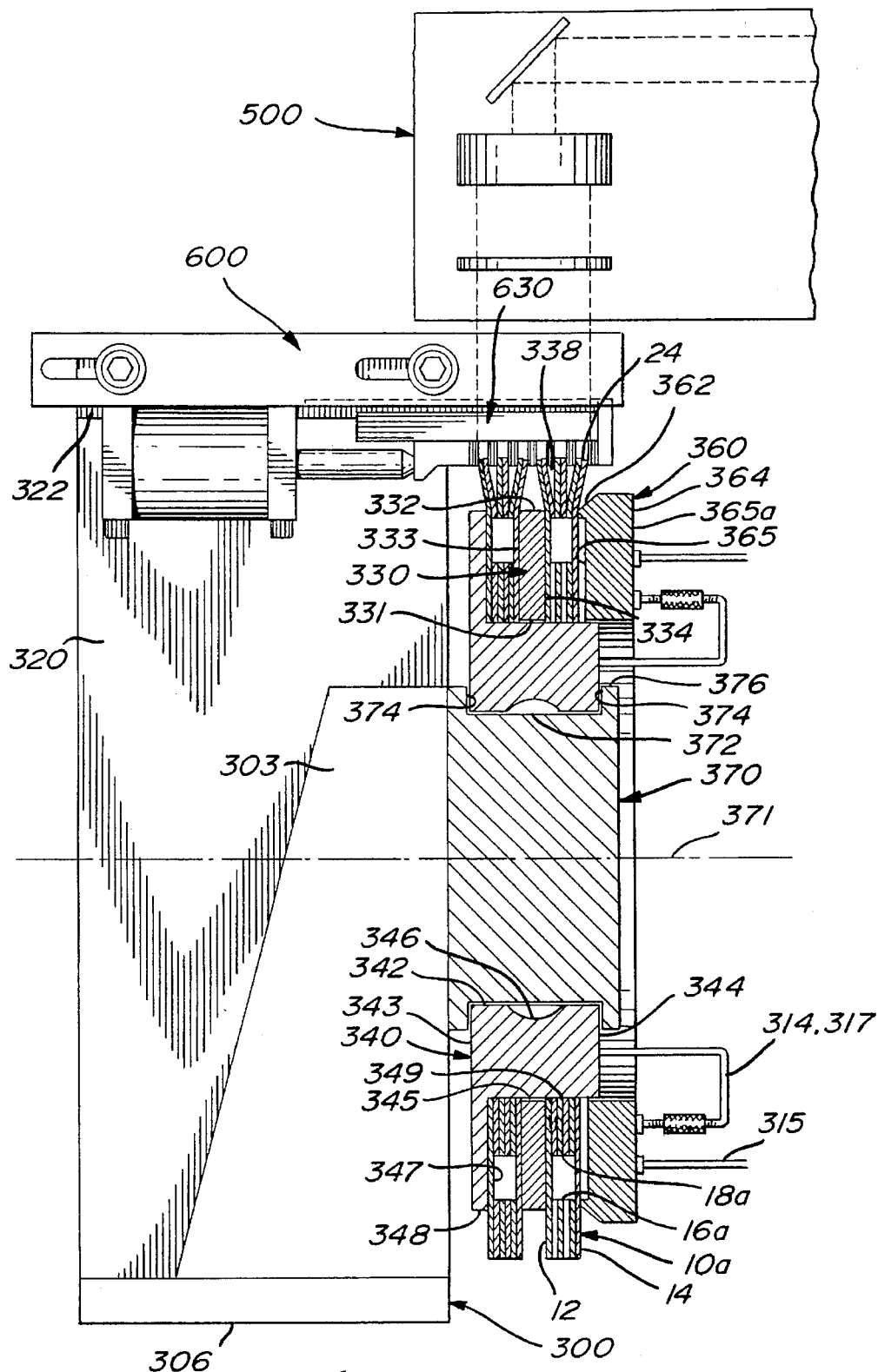
FIG. 4 is a fragmentary axial cross-section taken through a laser assembly welding jig for welding the outside diameter of the outer concentric stage of annular plates and end plates forming the bellows.

PHASE III: Referring to FIG. 1 and FIG. 4, end plate 12, external stage sub-assembly 16A from phase 1, internal stage sub-assembly 18A from phase 2, and end plate 14 are assembled at an assembly welding station 300 and outside diameters of end plate 12, external stage 16 and end plate 14 are welded to their respective adjacent counterparts at seams 24 to form a pre-welded bellows 10a as will be described later.

Figure 5:
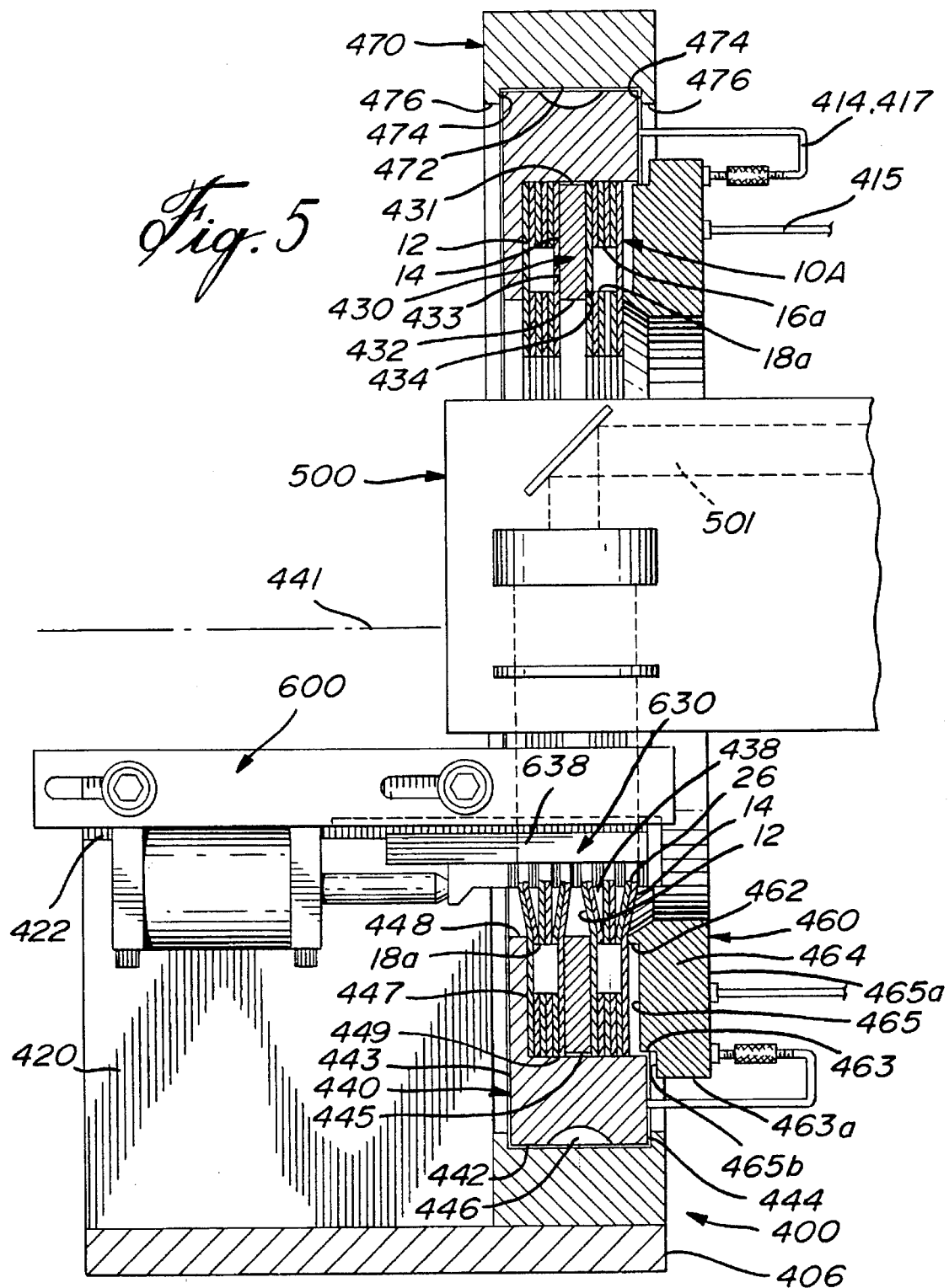
FIG. 5 is a fragmentary axial cross-section taken through a laser assembly welding jig for welding the inside diameter of the inner concentric stage of annular plates and end plates forming the bellows.

PHASE IV: Referring to FIGS. 1 and 5, inside diameters of end plate 12, internal stage 18 and end plate 14 of the pre-welded bellows 10a are welded at seams 26 to their respective adjacent counterparts to form bellows 10 at an assembly welding station 400 as will be described later.

PHASE I

Referring to FIGS. 1 and 2, sub-assembly welding station 100 includes an annular ring 140 journaled to a structure 170 for rotation therein, a base 106, a column 120, a clamping ring 160, and a comb assembly 600.

Structure 170 is mounted perpendicular to base 106 and provided with an internal annular wall 172 which is defined on each side by annular abutment walls 174. The internal radial dimension of annular wall 172 and the axial dimension between the abutment wall 174 are such as to allow annular ring 140 to rotate without having any significant radial or axial play. The central opening defined by inner rim 176 of annular abutment walls 174 is such that the clamping means 114, clamping ring 160, beam delivery system 500, and comb holder assembly 600 are allowed to be passed therethrough.

Annular ring 140 has a horizontal axis 141 comprising an external circumferential wall 142, an inboard radial wall 143, an outboard radial wall 144, and an internal annular wall 145. Gear teeth 146 are provided at the external circumferential wall 142 to match with a driving means (not shown). It is also contemplated to provide the inboard radial wall 143 with the proper gear teeth configuration to perform the same function. Instead of gear teeth 146, friction engagement may be contemplated. Driving means (not shown) which engages annular ring 140 and control means (not shown) provide the annular ring 140 with the specific desired rotational speed and the amount of rotations per welding cycle.

The internal wall 145 of annular ring 140 is defined, on the side adjacent to the inboard radial wall 143, by an annular abutment wall 147 and, on the side adjacent to the outboard radial wall 144, by a guiding wall 149. The inside diameter of the annular guiding wall 149 is such that it will allow the outer stage 16 to be slid in but will not allow significant radial play, and the axial dimension of the circumferential guiding wall 149 will be defined by the quantity of outer stage annular plates 19 to be welded therein.

The inside diameter 148 of the annular abutment wall 147 is such that it will allow the outer stage 16 to be bent slightly in the direction of the inboard radial wall 143 but will not allow the plates 19 in stage 16 to slide therethrough. Outboard radial wall 144 may be mounted with clamping means 114. It is also contemplated that a clamping force 115 may come from a source outside of the sub-assembly welding station; in that latter case, clamping means 114 would be replaced by a clamping ring holding means 117.

Clamping ring 160 includes, on the side facing the abutment wall 147 of annular ring 140, a pusher sleeve 162 and, on the side facing the clamping means 114, 115, stiffener ring 164.

The pusher sleeve 162 is adapted to slide inside the guiding wall 149 of ring 140, and the sleeve is allowed to move axially freely but with restricted radial play. The inside dimension of the pusher sleeve 162 is similar to the inside diameter 148 of abutment wall 147 allowing, in this way, the stage 16 to be bent slightly in the direction of the outboard radial wall 144. The axial dimension of pusher sleeve 162 of clamping ring 160 is such that when clamping ring 160 is forced against stage 16 by clamping means 114 or 115, stiffener ring 164 does not interfere with the outboard radial wall 144 of annular ring 140, and stage 16 is positively pressed against abutment wall 147 of annular ring 140.

Stiffener ring 164 is an extension of pusher sleeve 162 and integral therewith to form clamping ring 160 and is provided with two radial planar surfaces 165, 165a. The first radial planar surface 165 is adjacent to pusher sleeve 162, and the second radial planar surface 165a is on the other side of stiffener ring 164 in relation to first radial planar surface 165, and it faces clamping means 114 or clamping force 115, and the inside and outside diameters of stiffener ring 164 are such that stiffener ring 164 will not interfere with comb holder 600, beam delivery system 500, clamping means 114, or the abutment wall inside diameter 176 of structure 170.

Column 120 is mounted to base 106 on the side of the inboard radial wall 143 of annular ring 140 and provided with a planar surface 122 to receive comb assembly 600 as will be described later. Planar surface 122 is parallel to the axial axis 141 of annular ring 140 and perpendicular relative to base 106.

Figure 6:
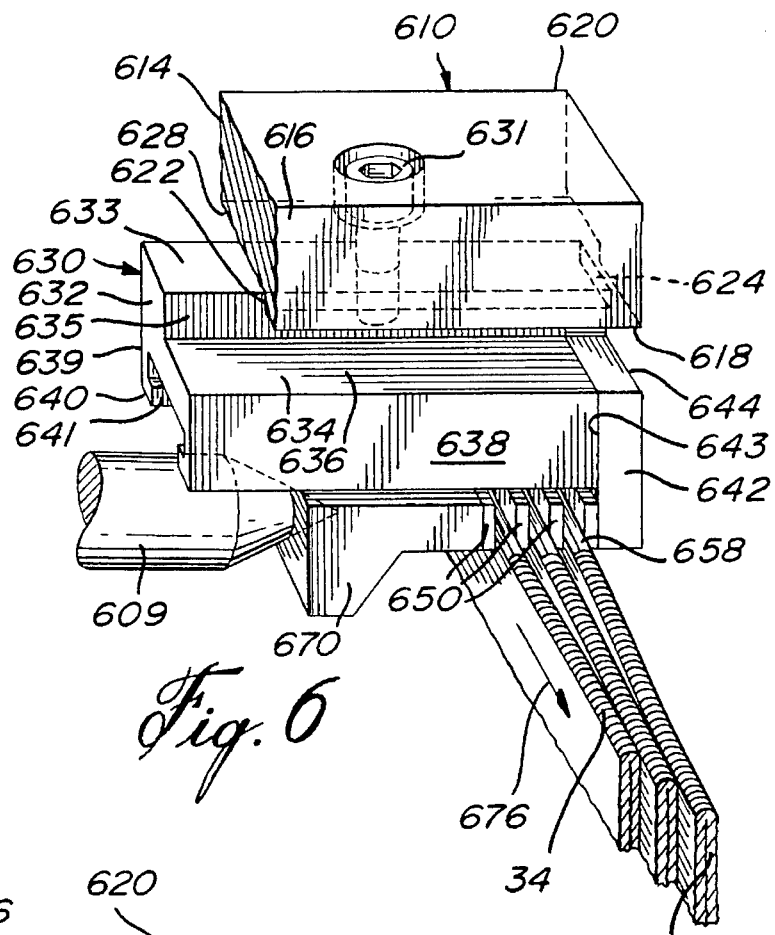
FIG. 6 is an enlarged fragmentary perspective view of a detail of the welding jig.
Figure 9:
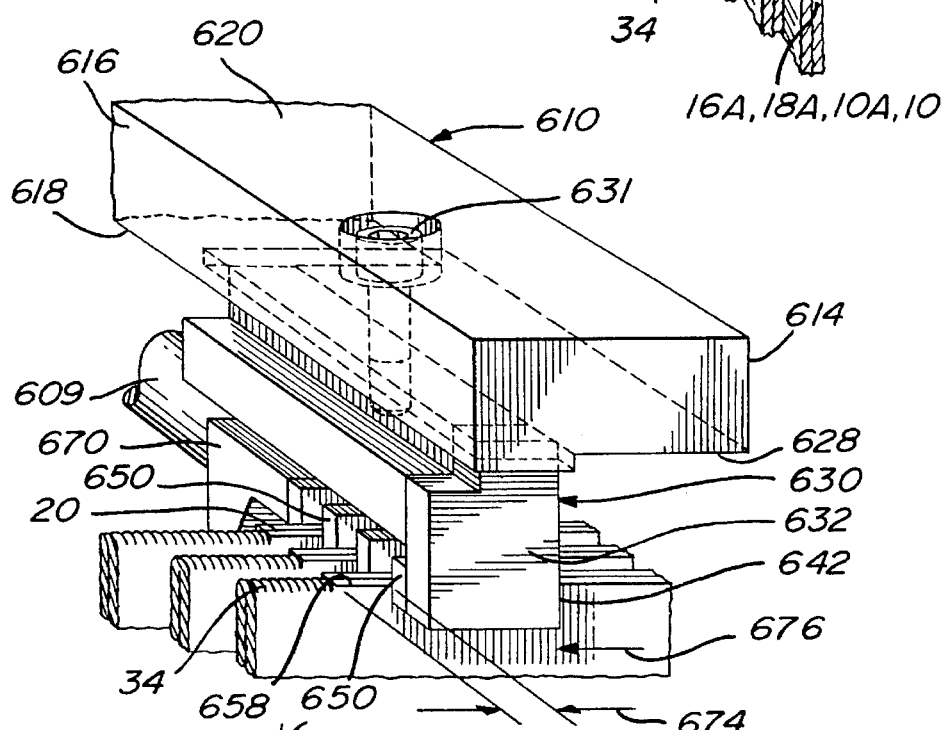
FIG. 9 is an enlarged fragmentary perspective view of a detail of the welding jig.

Comb assembly 600 will now be described in reference to FIGS. 2, 6, and 9. The comb assembly 600 includes a shank 610, a cylinder 608, cylinder mounting bolts 607, a blade holder assembly 630, and clamping bolt 631.

Shank 610 is a rectangular longitudinal bar provided with a first planar surface 614 to be mounted adjacent to the column planar surface 122. A second planar surface 616 is provided on the other side of the shank 610 relative to the first planar surface 614 and is parallel therewith. A third planar surface 618 is at right angles with the first and second planar surfaces 614, 616, and is parallel and faces base 106 when shank 610 is mounted to the column planar surface 122. A fourth planar surface 620 is provided on the top of the shank 610 and is parallel to the third planar surface 618. Longitudinal oblong slots 611, 611A pass through shank 610 between the first and second planar surfaces 614 and 616, and the slots are situated generally at the ends of shank 610 opposite inboard radial wall 143 of annular ring 140. When shank 610 is mounted to planar surface 122, the distance between slots 611 and 611A is such that shank 610 will be allowed limited axial movement relative to the mounting bolts 606. Planar surface 122 of column 120 is provided with tapped holes to receive mounting bolts 606. The other end of shank 610 relative to the first end is provided with a longitudinal recessed abutment wall 622 (FIG. 6), which is parallel and faces second planar surface 616 and is provided with a transversal recessed abutment wall 624. Abutment wall 624 is perpendicular and adjacent to abutment wall 622 and faces the second end of shank 610 to receive blade holder assembly 630 as will be described later.

Cylinder 608, as shown in FIG. 2, is a spring return, single action, fluid cylinder mounted by means of bolts 607 on the third planar surface 618 of shank 610. A piston 609 extends from the cylinder and faces blade holder assembly 630 to engage and release it as will be described later. The longitudinal axis of cylinder 608 is parallel to planar surfaces 616 and 618 of shank 610. Shank 610 is provided with tapped holes to receive bolts 607. Thus, when shank 610 is mounted to column 120, the longitudinal axis of cylinder 608 is parallel to axis 141 and perpendicular to the radial plane of annular ring 140. Cylinder 608 is provided with fluid inlet and control valves (not shown) to control the action and force of piston 609 against the blade holder assembly 630.

In a preferred embodiment, blade holder assembly 630 includes a blade holder 632, spacer blades 650, and a pusher block 670.

Blade holder 632 is in the form of a rectangular bar which had a first side 633 and an adjacent second side 638 cut longitudinally by a notch 634. The abutment wall 635 perpendicular to first side 633 and surface 636, both formed by notch 634, are such that when blade holder 632 is mounted to shank 610 by means of clamping bolts 631 in tapped hole 637. Abutment wall 635 of blade holder 632 sits against recessed abutment wall 622 of shank 610, and first side 633 sits on the surface 628 created between the recessed abutment walls 622 and 624. Second side 638 extends in front of second planar surface 616 of shank 610, and surface 636 of blade holder 632 does not interfere with third planar surface 618 of shank 610. Blade holder 632 is also provided with a third side 639 perpendicular to first side 633. A fourth side 640, parallel to first side 633, is provided with a longitudinal tee slot 641, parallel to sides 633, 638 or 639, to receive counterpart spacer blade 650 and pusher block 670 as will be described later. A first end of slot 641 faces piston 609 of cylinder 608 and a second end on the other side of the blade holder relative to the first end. The second end is provided with an end wall 642. End wall 642 is provided with two parallel planar surfaces 643, 644, and with the same transversal contour as the first three sides 638, 633, 639. The first planar surface 643, adjacent to second end of blade holder 632, extends beyond the fourth side 640 perpendicular to sides 638, 633, 639, such that it supports spacer blade 650 against axial forces as will be described later. A portion of second planar surface 644, which has the same dimension as the first planar surface 643, sits against recessed abutment wall 624 of shank 610 when blade holder 632 is mounted to shank 610. Thus, the longitudinal axis of blade holder 632 is parallel to axis 141 of annular ring 140 when holder 630 is mounted to shank 610.

As shown in FIG. 7, spacer blade 650 is provided with two planar parallel surfaces 651, 652. The outline thereof includes a tee section in the upper portion 653. The tee section is such that it engages longitudinally tee slot 641 of blade holder 632 freely but with limited transversal play when planar surfaces 651, 652 are projected perpendicular to sides 633, 638 or 639 of blade holder 632. A lower section 654 of spacer blade 650 is generally rectangular and projects at 655 from the base of the tee in the direction of side 638, such that when the spacer blade 650 is in blade holder 632, the end wall of projection 655 is substantially in the plane of side 638, and the upper edge of projection 655 clears surface 640 of blade holder 632 when spacer blade 650 is inserted in blade holder 632. The height 657 of the lower section 654, that is, the portion which extends below surface 640, is such as to engage between pairs of working pieces as will be described later. The lower portion 654 can have a nose section such as protrusion 656 which projects forwardly in the direction of side 639. The nose or protrusion 656 is such that when working pieces are separated by spacing blade 650, the pre-welded seam level 658 (FIGS. 9 and 6) is just above the upper edge of protrusion 656. The lower part of portion 654 of spacing blade 650 may be rectilinear (not shown) to separate rectilinear working pieces; concave, such as in the embodiment of FIG. 7, at 659 to separate circular working pieces at the outside diameter; or convex at 660 to separate annular working pieces at the inside diameter thereof.

Pusher block 670 is provided with generally the same transversal outline as the spacer blades 650, it being allowed to move longitudinally with limited transversal play. A first planar surface 671 is adjacent and parallel to spacer blade 650, while a second planar surface 672 is parallel to the first planar surface 671 and on the opposite end of the pusher block 670. The end 672 is larger than the end 671 to accommodate a conical recess 673 in order to receive piston 609 of cylinder 608 when cylinder 608 and blade holder 632 are mounted to shank 610, and pusher block 670 is inserted in the blade holder 632. The piston 609 is provided with a conical end to match cavity 673. The longitudinal distance between the first and second planar surfaces 671, 672 is such that when piston 609 is pressing on pusher block 670, planar surfaces 671, 672 are kept perpendicular to sides 638, 633 and 639 of blade holder 632.

Shapes other than a tee slot may be considered for blade holder 632, spacing blade 650, and pusher block 670 as long as the function is the same.

Having thus described the components of the welding station 100, reference will now be made to the loading and welding process of the station. In a first stage, a pair or a plurality of pairs of annular outer stages 16 are axially inserted, from the outboard radial wall 144, inside guiding wall 149 of annular ring 140 which allows stage 16 to be axially slid in freely but with limited radial play, thus keeping stages 16 concentric with annular ring 140. The pusher sleeve 162 of clamping ring 160 is inserted thereafter, and clamping means 114 is applied against the second radial surface 165a of stiffener ring 164 of clamping ring 160 such that clamping ring 160 pushes axially against stage 16 and against abutment wall 147 of annular ring 140 and frictionally engages stages 16 in unison with annular ring 140, thus engaging stages 16 to rotate in unison with annular ring 140. Each stage is made up of at least two pairs of annular plates 19.

Spacer blades 650 are then mounted in blade holder 632 with pusher block 670 making up blade holder assembly 630, and the spacer blades 650 are inserted between pairs of plates 19. First, the inside edges of the annular external stage 16 are arranged with the end wall 642 of blade holder 632 facing in the direction of clamping ring 160 and the longitudinal axis of blade holder assembly 630 being parallel to axis 141 of annular ring 140. The spacer blades 650 are then inserted with end wall 642 at one extremity followed by a spacer blade 650, a pair of plates 19, spacer blade 650, another pair of plates 19, and so on, to terminate with a spacer blade 650 and pusher block 670. The first and last spacer blade 650 adjacent to end wall 642 and pusher block 670 are used as friction blades.

A spacer ring 130 may be used between a pair or plurality of pairs of external sub-assemblies 16a, to compensate for axial deflection created by spacer blades 650, forming spaces 138. Given the linear speed of welding and fusion bath solidification time such that when a plurality of seams 34 are being welded simultaneously, as will be described, the individual fusion bath of each pair of sub-assemblies does not interconnect itself with the adjacent one before it solidifies due to the spacers 650. Spacer ring 130 is an annular ring provided with two radial, generally planar, parallel surfaces 133, 134, a circumferential wall 131, and an internal wall 132. The diameter of external circumferential wall 131 is such that the spacer ring 130 is allowed to slide freely inside guiding wall 149 but with limited radial play. The internal diameter of internal wall 132 is similar to the inside diameter 148 of abutment wall 147 of annular ring 140. The spacing apart of the two radial, generally planar surfaces 133, 134, determines the axial compensation of the stage 16.

Blade holder assembly 630 is mounted to shank 610 of comb assembly 600 by means of clamping bolt 631 (FIG. 6) and control valve of cylinder 608 is activated such that piston 609 of cylinder 608 engages longitudinally pusher block 670, thus pushing adjacent spacer blades 650 against adjacent pairs of plates 19 forming seams to be welded. Slots 611 and 611a of shank 610 provide the adjustment for the comb assembly 600 such that blade holder assembly 630 may be centered axially with the working pieces to be welded.

As seen in FIG. 2, laser beam delivery system 500 is moved inside the internal circumference of annular outer stage 16 such that the longitudinal axis 503a, 507a, 513a of laser oblong focal beam 505, 509, 515 (see FIGS. 2, 10a, 10b, 11a, 11b) is generally parallel to the longitudinal axis of second side 638 of blade holder 632 and generally perpendicular to the relative direction 676 of the working pieces to be welded and axially centered over the seams 20 or the plurality of seams to be welded, and the oblong focal beam 505, 509, 515 is slightly over the pre-welded seam level 658 (FIG. 9), and driving means is engaged such that annular ring 140 and stage 16 rotate in the relative direction 676. Spacer blades 650 are frictionally engaged with plates 19 keeping seams to be welded together by means of the force applied by cylinder 608 to pusher block 670 thus to spacing blade 650 and separating the seams not to be welded between each other. The laser beam is energized such that a seam weld 34 or a plurality of seam welds 34 are produced simultaneously in front of blade holder assembly 630 at 20 to form outer stage sub-assembly 16a or a plurality of outer stage sub-assemblies 16a. The portions of the focal oblong beam 505, 509, 515, which happen to be facing spaces between welded seams 34 are defocused, thus losing focal density rapidly between the sides of the workpieces which are only slightly convergent.

When an outside clamping force 115 is used instead of clamping means 114, clamping force 115 is applied before the driving means is engaged.

Figure 8A:
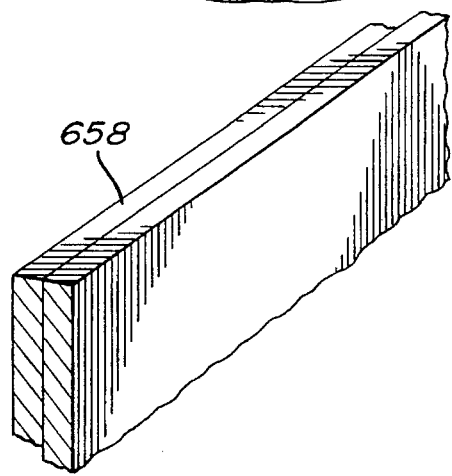
FIG. 8a is an enlarged fragmentary cross-section taken through a seam before welding.
Figure 8B:
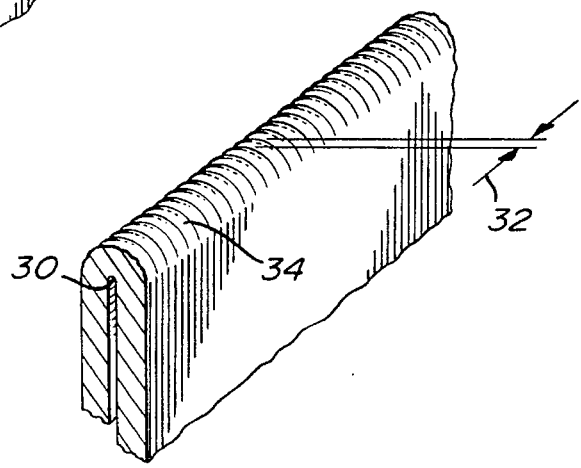
FIG. 8b is an enlarged fragmentary cross-section taken through a welded seam.

The distance 674 of the focal beam from second side 638 of blade holder 632 determines, up to the limit of capillarity of the molten material to be welded, the size of radius 30 (FIG. 8b). Laser pulse rate and linear welding speed determine welding pitch 32 of welded seam 34.

In the next two following steps, the process is inverted.

The laser beam is shut off, and the laser beam delivery system is pulled out of welding station 100.

Blade holder assembly 630 is withdrawn from shank 610 and away from stage 16a. Clamping means 114 and clamping ring 160 are removed, and the outer stage sub-assembly 16a is removed from ring 140.

A $CO_2$ laser was illustrated in the above example. However, an Nd:Yag laser would probably be more efficient since the Yag laser beam can be more easily transmitted, such as by fiber optics.

PHASE II

Referring to FIGS. 1, 3, 6, 7, 8, and 9, welding station 200 includes an annular ring 240 journaled to an axle 270 for rotation thereabout, a post 203 integrated to axle 270, a base 206, a column 220, a clamping ring 260, and a comb assembly 600. In Phase II, those elements which are similar to elements in Phase I have been identified by corresponding numerals, which have been raised by 100.

Axle 270 is mounted to post 203, and post 203 is mounted to base 206 such that axis 271 of axle 270 is parallel to base 206, and axle 270 is provided with an external circumferential wall 272 which is defined on each side by annular abutment walls 274. The external dimension of circumferential wall 272 and the axial dimension between the abutment wall 274 are such as to allow the annular ring 240 to rotate without having radial or axial significant play. The outside diameter 276 of the annular abutment walls 274 is such as to allow the clamping means 214, clamping ring 260, beam delivery system 500, and comb holder assembly 600 to be passed thereabout.

Annular ring 240 comprises an internal annular wall 242, an inboard radial wall 243, an outboard radial wall 244, and an external circumferential wall 245. Gear teeth 246 are provided at the internal wall 242 to be engaged with a driving means (not shown).

The external circumferential wall 245 of annular ring 240 is defined, on the side adjacent to the inboard radial wall 243, by an annular abutment wall 247 and, on the side adjacent to the outboard radial wall 244, by a circumferential guiding wall 249. The outside diameter of the guiding wall 249 is such that it will allow the internal stage 18 to be slid over but will not allow significant radial play, and the axial dimension of the guiding wall 249 will be defined by the quantity of external plates to be welded in a given stage sub-assembly.

The outside diameter 248 of the annular abutment wall 247 is such that it will allow the internal stage 18 to be bent slightly in the direction of the inboard radial wall 243 but will not allow the plates to slide thereabout. Outboard radial wall 244 may be mounted with clamping means 214. It is also contemplated that the clamping force 215 may come from a source outside of the sub-assembly welding station; in the latter case, clamping means 214 would be replaced by a clamping ring holding means 217.

Clamping ring 260 includes, on the side facing abutment wall 247 of annular ring 240, a pusher sleeve 262 and, on the side facing clamping means 214, 215, a stiffener ring 264.

The pusher sleeve 262 is similar to pusher sleeve 162 and operates in the same manner. The axial dimension of the clamping ring pusher sleeve 262 is such that when clamping ring 260 is forced against stage 18 by clamping means 214 or 215, stiffener ring 264 does not engage the outboard radial wall 244 of annular ring 240, and stage 18 is positively pressed against abutment wall 247 of annular ring 240 by means of sleeve 262.

Column 220 is mounted to base 206 on the side of the inboard radial wall 243 of annular disc 240 and is provided with a planar surface 222 to receive comb assembly 600 as has already been described in relation to Phase I. Planar surface 222 is parallel to the horizontal axis 271 of axle 270 and perpendicular relative to base 206.

Comb assembly 600, described in Phase I, is mounted to planar surface 222 in the same manner as described, that is, it is mounted to planar surface 122 of column 120.

Having thus described the components of the welding station 200, reference will now be made to the loading and welding process of said station.

A pair of plates or a plurality of pairs of annular plates forming stage 18 are axially inserted, from the outboard radial wall 244 on guiding wall 249 of annular ring 240. Pusher sleeve 262 of clamping ring 260 is inserted thereafter, and clamping means 214 is applied against the second radial surface 265a of stiffener ring 264 of clamping ring 260 such that clamping ring 260 pushes the plates of stage 18 against abutment wall 247 of annular ring 240 and frictionally engages the plates of stage 18 in unison with annular ring 240, thus engaging the annular plates to rotate in unison with annular ring 240.

Spacer blades 650 are mounted in blade holder 632 with pusher block 670 to form blade holder assembly 630. The spacer blades 650 are inserted between pairs of plates of stage 18 in the same manner as with stage 16 in Phase I.

Spacer ring 230 may be used between a pair or a plurality of pairs of internal plates, to compensate for radial deflection created by spacing blade 650.

The welding equipment or technique used in Phase II are identical to Phase I.

Laser beam delivery system 500 is moved outside the external circumference of annular internal stage 18 such that the laser oblong focal beam or plurality of oblong focal beams are longitudinally generally parallel to the longitudinal axis of the side 638 of blade holder 632 and generally perpendicular to the relative direction 676 of the working pieces to be welded and axially centered over the seams or the plurality of seams to be welded. The driving means engages such annular ring 240, and plates 18 rotate in the direction 676 from side 639 to side 638 of blade holder 632, and the laser beam is energized such that a seam weld 34 or a plurality of seam welds 34 are produced simultaneously in front of blade holder assembly 630 at 22 to produce an internal stage sub-assembly 18a or a plurality of sub-assemblies 18a.

In the next two following steps, the process is inverted.

The laser beam is cut off, and the laser beam delivery system is pulled away from the welding station 200.

Blade holder assembly 630 is withdrawn from shank 610 and away from stage 18. Clamping means 214 and clamping ring 260 are removed, and the internal stage sub-assembly 18a is pulled off of annular ring 240.

PHASE III

Referring to FIGS. 1 and 4, assembly welding station 300 includes an annular ring 340 journaled to an axle 370 for rotation therewith. A post 303 is integrated to axle 370 on a base 306. A column 320 mounts clamping ring 360 and a comb assembly 600.

Axle 370 is mounted to post 303 and post 303 is mounted to base 306 such that axis 371 of axle 370 is parallel to base 306, and axle 370 is provided with an external circumferential wall 372 which is defined on each side by annular abutment walls 374. The external dimension of circumferential wall 372 and the axial dimension between the abutment wall 374 are such as to allow the annular ring 340 to rotate without having radial or axial significant play. The outside diameter 376 of the annular abutment walls 374 is such that it allows the clamping means 314, clamping ring 360, beam delivery system 500, and comb holder assembly 600 to be moved. Like elements in Phase III compared to Phases I and II have been identified by numerals which have been raised by 100 as compared with Phase II.

Annular ring 340 comprises an internal wall 342, an inboard radial wall 343, an outboard radial wall 344, and an external circumferential wall 345.

The external circumferential wall 345 of annular ring 340 is defined, on the side adjacent to the inboard radial wall 343, by an annular abutment wall 347 and, on the side adjacent to the outboard radial wall 344, by a guiding wall 349. The outside diameter of the guiding wall 349 is such that it will allow end plates 12 and 14 and the internal stage sub-assembly 18a to be slid in but will not allow significant radial play, and the axial dimension of the guiding wall 349 will be defined by the quantity of pre-welded bellows 10a to be welded at one time.

The outside diameter 348 of the annular abutment wall 347 is such that it will allow the end plate 12 and external stage 16 to be bent slightly in the direction of the inboard radial wall 343 but will not allow external stage 16 to slide thereabout. Outboard radial wall 344 may be mounted with clamping means 314.

Clamping ring 360 includes, on the side facing abutment wall 347 of annular ring 340, a pusher sleeve 362 and, on the side facing clamping means 314, 315, a stiffener ring 364.

The inside diameter of pusher sleeve 362 is such that it does not interfere with the outside diameter of guiding wall 349 of annular ring 340. The outside dimension of the pusher sleeve 362 is similar to the abutment wall outside diameter 348 allowing the end plate 14 and stage 16 to be bent slightly in the direction of the outboard radial wall 344. The axial dimension of the clamping ring pusher sleeve 362 is such that when clamping ring 360 is forced against adjacent end plate 14, by means of clamping means 314 or 315, external stage sub-assembly 16a and end plates 12 and 14 are positively pressed against abutment wall 347 of annular ring 340.

First radial planar surface 365 is adjacent to pusher sleeve 362, and second radial planar surface 365a, on the other side of stiffener ring 364, faces clamping means 314, and the inside diameter of stiffener ring 364 is adapted to slide along guiding wall 349.

Column 320 is mounted to base 306 on the side of the inboard radial wall 343 of annular disc 340 and is provided with a planar surface 322 to receive comb assembly 600. Planar surface 322 is parallel to the axial axis 371 of axle 370 and perpendicular to base 306.

Comb assembly 600, described in Phase I, is mounted to planar surface 322.

Having thus described the components of the welding station 300, reference will now be made to the loading and welding process of this station.

Pre-welded bellows 10a, annular end plate 12, internal stage sub-assembly 18a, external stage sub-assembly 16a, and annular end plate 14 are axially inserted in this order, from the outboard radial wall 344. Outside guiding wall 349 of annular ring 340 retains end plates 12, 14 and sub-assembly 18a with limited radial play, thus keeping sub-assembly 18a and end plates 12, 14 concentric with annular ring 340. A temporary guiding means (not shown) may be used to radially center outer sub-assembly 16a with end plates 12, 14, thus keeping external sub-assembly 16a concentric with annular ring 340. Pusher sleeve 362 of clamping ring 360 is inserted thereafter, and clamping means 314 is applied against the second radial surface 365a of stiffener ring 364 of clamping ring 360 such that clamping ring 360 axially pushes end plates 12 and 14 and external sub-assembly 16a against abutment wall 347 of annular ring 340 and frictionally engages covers 12, 14 and external sub-assembly 16a in unison with annular ring 340, thus engaging end plates 12, 14 and external sub-assembly 16a to rotate in unison with annular ring 340.

Spacer blades 650 are mounted in blade holder 632 with pusher block 670 to form blade holder assembly 630. The spacer blades 650 are inserted between pairs of plates at the circumference of the annular end plates 12, 14 and external sub-assembly 16a, with the end wall 642 of blade holder 632 facing in the direction of clamping ring 360. Spacer blades 650 are inserted against end wall 642, adjacent end plate 14 and one plate of external sub-assembly 16a. The spacer blades 650 are then inserted next to each pair of plates to terminate with a plate from outer sub-assembly 16a and end plate 12 as a pair and a spacer blade 650 and then pusher block 670. The first and last spacer blade 650 adjacent to end wall 642 and pusher block 670 are used as friction blades.

Spacer ring 330 may be used between pre-welded bellows 10a or a plurality of pre-welding bellows 10a, to compensate for radial deflection created by spacer blade 650.

Blade holder assembly 630 is mounted to shank 610 of comb assembly 600 by means of clamping bolt 631, and control valve of cylinder 608 is activated such that piston 609 of cylinder 608 engages longitudinally pusher block 670, thus pushing adjacent spacing blade 650 against an adjacent counterpart which pushes against its adjacent counterpart to be welded which pushes adjacent spacing blade 650 and so on up to the relative last spacing blade which sits against end wall 642.

Welding equipment or technique used in Phase III are identical to Phase I.

Laser beam delivery system 500 is, relatively to sub-assembly welding station 300, moved outside the external circumference of annular pre-welded bellows 10a such that the laser oblong beam or plurality of oblong focal beams are longitudinally generally parallel to side 638 of blade holder 632 and generally perpendicular to the relative direction 676 of the working pieces to be welded and axially centered over the seams 34 or the plurality of seams 34 to be welded. Driving means are then engaged with annular ring 340, and pre-welded bellows 10*a* rotates in the direction 676 relatively from side 639 to side 638 of blade holder 632, and the laser beam is energized such that a plurality of seam welds are produced simultaneously in front of blade holder assembly 630 at 24 to form pre-welded bellows 10*a*.

The laser beam is shut off, and the laser beam delivery system is withdrawn from welding station 300.

Blade holder assembly 630 is pulled out of shank 610 and out of pre-welded bellows 10*a*, clamping means 314 and clamping ring 360 are taken off, and pre-welded bellows 10*a* or a plurality of pre-welded bellows 10*a* are pulled out of annular ring 340.

PHASE IV

Referring to FIGS. 5, 6, 7, 8, and 9, assembly welding station 400 includes an annular ring 440 journaled to a structure 470 for rotation therein, including column 420 mounted on a base 406. A clamping ring 460 and a comb assembly 600 are also provided. Elements which correspond to elements in Phases I, II and III have numerals which have been raised by 100 as compared to Phase III.

Structure 470 is mounted perpendicular to base 406 and is provided with an internal annular wall 472 which is defined on one side by annular abutment wall 474. The internal dimension of annular wall 472 and the axial dimension of the abutment wall 474 are such that the annular ring 440 is permitted to rotate without having significant radial or axial play. The inside diameter 476 of the annular abutment walls 474 is such that it allows the clamping means 414, clamping ring 460, beam delivery system 500, and comb holder assembly 600 to be passed therethrough.

Annular ring 440, provided with axial axis 441, comprises an external circumferential wall 442, an inboard radial wall 443, an outboard radial wall 444, and an internal annular wall 445. Gear teeth 446 are provided at the external circumferential wall 442.

The internal annular wall 445 of ring 440 is defined, on the side adjacent to the inboard radial wall 443, by an annular abutment wall 447 and, on the side adjacent to the outboard radial wall 444, by a guiding wall 449. The inside diameter of the guiding wall 449 is such that it will allow the pre-welded bellows 10*a* to be slid in but will not allow significant radial play, and the axial dimension of the guiding wall 449 will be defined by the quantity of pre-welded bellows 10*a* to be welded therein.

The inside diameter 448 of the annular abutment wall 447 is such that it will allow end plates 12 and stage 18 to be bent slightly in the direction of the inboard radial wall 443 but will not allow internal stage 18 to slide therethrough. Outboard radial wall 444 may be provided with clamping means 414.

Clamping ring 460 includes, on the side facing abutment wall 447 of annular ring 440, a pusher sleeve 462 and, on the side facing clamping means 414, 415, a stiffener ring 464.

The outside diameter of pusher sleeve 462 is such that it does not interfere with the inside diameter of guiding wall 449 of annular ring 440. The inside dimension of the pusher sleeve 462 is similar to the abutment wall inside diameter 448 allowing the stage 18 or end plate 14 to be bent slightly in the direction of the outboard radial wall 444. The axial dimension of the clamping ring pusher sleeve 462 is such that when clamping ring 460 is forced against adjacent end plate 14 by means of clamping means 414 or 415, internal sub-assembly 18*a* and end plates 12 and 14 are positively pressed against abutment wall 447 of annular ring 440.

Stiffener ring 464 is an extension of pusher sleeve 462 and integral thereto to form clamping ring 460 and is provided with three radial planar surfaces 465, 465*a*, 465*b*. The first radial planar surface 465 is adjacent to pusher sleeve 462, and the second radial planar surface 465*a* is on the other side of stiffener ring 464 in relation to the first radial planar surface 465 and faces clamping means 414. The external circumference of stiffener ring 464 is provided with two circumferential walls 463, 463*a*. The first circumferential wall 463, adjacent to first planar surface 465, is adapted to slide inside the guiding wall 449. The axial dimension of first circumferential wall 463 is such that when clamping ring 460 is forced against adjacent end plate 14, third radial surface 465*b* connecting the two circumferential walls 463, 463*a*, does not interfere with outboard radial wall 444 of annular ring 440, and the outside diameter of the second circumferential wall 463*a* is such that second circumferential wall 463*a* will not intervene with clamping means 414 or the abutment wall inside diameter 476 of structure 470. The inside diameter of stiffener ring 464 is such that it does not interfere with comb holder assembly 600 or the beam delivery system 500.

Comb assembly 600, described in Phase I, is mounted to planar surface 422.

A pre-welded bellows 10*a* is axially inserted from the outboard radial wall 444 inside guiding wall 449 of annular ring 440. A temporary guiding means (not shown) is inserted at the inside diameter of end plates 12, 14 and internal sub-assembly 18*a*, thus keeping the internal sub-assembly concentric with annular ring 440. Pusher sleeve 462 of clamping ring 460 is then inserted thereafter, and clamping means 414 is applied against the second radial surface 465*a* of stiffener ring 464 of clamping ring 460 such that clamping ring 460 axially pushes end plates 12 and 14 and internal sub-assembly 18*a* against abutment wall 447 of annular ring 440 and frictionally engages end plates 12, 14 and internal sub-assembly 18*a* in unison with annular ring 440, thus engaging covers 12, 14, and internal sub-assembly 18*a* to rotate in unison with annular ring 440. The temporary guiding ring is then removed.

Spacer blades 650 mounted in blade holder 632 are inserted between pairs of plates at the inside circumference of annular end plates 12, 14 and internal sub-assembly 18*a*. Spacer blades 650 are inserted with end wall 642 adjacent a spacer blade 650 and next to an end plate 14 and one plate of internal sub-assembly 18*a*. A spacer blade 650 is then inserted, and then a pair of plates to terminate with a plate from internal sub-assembly 18*a* and end plate 12 and then spacer blade 650 and pusher block 670. The first and last spacing blade 650 adjacent to end wall 642 and pusher block 670 are used as friction blades.

Spacer ring 430 may be used between pre-welded bellows 10*a* or a plurality of pre-welded bellows 10*a*, to compensate for radial deflection created by spacer blade 650.

Blade holder assembly 630 is mounted to shank 610 of comb assembly 600 by means of clamping bolt 631, and control valve of cylinder 608 is activated such that piston 609 of cylinder 608 engages longitudinally pusher block 670, thus pushing adjacent spacing blade 650 against an adjacent counterpart which pushes against its adjacent counterpart to be welded which pushes adjacent spacer blade 650 and so on up to the relative last spacer blade which finally sits against end wall 642.

Laser beam delivery system 500 is moved inside the annular pre-welded bellows 10a such that the laser oblong beam or plurality of oblong focal beams are longitudinally generally parallel to side 638 of blade holder 632 and generally perpendicular to the direction 676 of the working pieces to be welded and axially centered over the seams or the plurality of seams to be welded. Driving means is engaged to rotate annular ring 440 and pre-welded bellows 10a in the direction 676 from side 639 to side 638 of blade holder 632. The laser beam is energized such that a plurality of weld seams are produced simultaneously in front of blade holder assembly 630 at 26 to produce bellows 10.

The laser beam is shut off, and the laser beam delivery system is pulled out of welding station 400.

Blade holder assembly 630 is withdrawn out of shank 610 and out of bellows 10. Clamping means 414 and clamping ring 460 are taken off, and the bellows 10 is pulled out of annular ring 440.

It has also been contemplated that the column 120, 220, 320, 420 and comb assembly 600 may be located on the side adjacent to outboard radial wall 144, 244, 344, 444.

Other pusher means may be contemplated instead of cylinder 608 as long as the function of compressing the spacer blades against adjacent workpieces to be welded such that the workpieces to be welded are held together and kept apart between each other up to the welded seams 34 have solidified.

I claim:

1. A method of welding at least a seam on workpieces comprising the steps of defining a welding station including a laser welding source, defining a focal plane spaced from the laser welding source and to project a laser beam so formed at a right angle to the focal plane, modifying the laser beam to project an oblong pattern at the focal plane, having a major axis and a minor axis, with the major axis extending transversely of the focal plane relative to the seam to form a welding-zone such as to span the seam to be welded, moving at least one of the welding station and a combination of workpieces, relative to one another, such that the seam to be welded passes through the welding zone whereby at least a welded seam is formed continuously on the workpieces.

2. A method as defined in claim 1, including the further step of locating a second optical element between the first optical element and the focal plane, whereby the second optical element will focalize the beam in its predetermined oblong pattern at the focal plane.

3. A method as defined in claim 2, wherein the major axis of the oblong pattern is adjusted by controlling the distance between the first and second optical elements.

4. A method as defined in claim 2, wherein the first optical element is a beam divider to divide the laser beam into a plurality of beams to extend between the first and second optical means and are generally aligned, and the second optical element is effective for focalizing the beams at the focal plane.

5. A method as defined in claim 4, wherein the divided laser beams extend parallel between the first and second optical elements.

6. A method as defined in claim 4, wherein the divided laser beams diverge between the first and second optical elements.

7. A method as defined in claim 4, wherein the divided laser beams converge between the first and second optical elements.

8. A method as defined in claim 4, wherein the beams form an oblong pattern at the focal plane and are aligned along the major axis of the respective oblong patterns.

9. A method as defined in claim 2, wherein a third optical element is located between the first and second optical elements, and the third optical element is a beam divider which divides up the beams into a plurality of aligned beams each having an oblong cross-section, and the second optical means focalizing the divided oblong beams such that the major axes of each oblong beam pattern on the focal plane are aligned.

10. An apparatus for welding at least a continuous seam to join workpieces, including jig means for maintaining the workpieces and the seam to be welded in a welding zone, welding means including at least a laser welding source and a focal plane spaced from the laser welding source at the welding zone, means passing the laser beam perpendicular to the focal plane, a first optical element placed in the path of the laser beam such that the beam forms an oblong pattern having a major axis and a minor axis with the major axis extending transversely of the seam to span the welding zone at the focal plane, means for moving one of the welding stations and the jig such that the seam to be welded passes continuously through the welding zone whereby at least a welded seam is formed continuously on the workpieces.

11. An apparatus as defined in claim 10, wherein the first optical element in the path of the laser beam is one of a lens and a mirror for modifying the laser beam to form the oblong pattern on the focal plane.

12. An apparatus as defined in claim 11, wherein a second optical element is provided between the first optical element and laser source, and the first optical element focalizes the beam on the focal plane.

13. An apparatus as defined in claim 12, wherein the second optical element is a beam divider to provide a plurality of laser beams extending between the first and second optical elements, and the first optical element focalizes the divided beams on the focal plane.

14. An apparatus as defined in claim 13, wherein the second optical element is a diffractive optical element.

15. An apparatus as defined in claim 13 wherein the plurality of beams extending between the first and second optical elements are parallel and are aligned.

16. An apparatus as defined in claim 13, wherein the divided laser beams between the first and second optical elements are divergent.

17. An apparatus as defined in claim 13, wherein the divided laser beams between the first and second optical elements are convergent.

18. An apparatus as defined in claim 12, wherein adjusting means are provided to control the distance between the first and second optical elements so as to vary the oblong beam pattern in the focal plane.

19. An apparatus as defined in claim 18, wherein the adjusting means controlling the distance between the first and second optical elements is effective to vary the major axis of the oblong beam pattern in the focal plane.

20. An apparatus as defined in claim 15, wherein adjustment means are provided for adjusting the distance between the first and second optical elements so as to adjust the focalization of the pattern on the focal plane and to adjust the intensity of the laser energy at the focal plane.

21. An apparatus as defined in claim 15, wherein the adjustment means are provided for adjusting the distance between the first and second optical elements and thus adjusting the intensity of the laser energy on the focal plane without changing the beam pattern.

22. An apparatus as defined in claim 13 wherein a plurality of beams includes confocal annular beam patterns between the first and second optical elements.

23. An apparatus as defined in claim 10, including a first optical element for focusing a plurality of laser beams to a predetermined focal point, fiber optics means having a receiving end and a delivery end, means for maintaining the receiving end at the predetermined focal point so that the laser beams may be transmitted by the fiber optic means, and a second optical element at the delivery end of the fiber optics means for projecting the laser beams.

24. An apparatus as defined in claim 23 wherein the first optical element is a diffractive optical element.

* * * * *